Aug. 27, 1957 W. C. ASHBY 2,804,237
FEED MECHANISM FOR ARTICLES
Filed Jan. 12, 1955 5 Sheets-Sheet 3

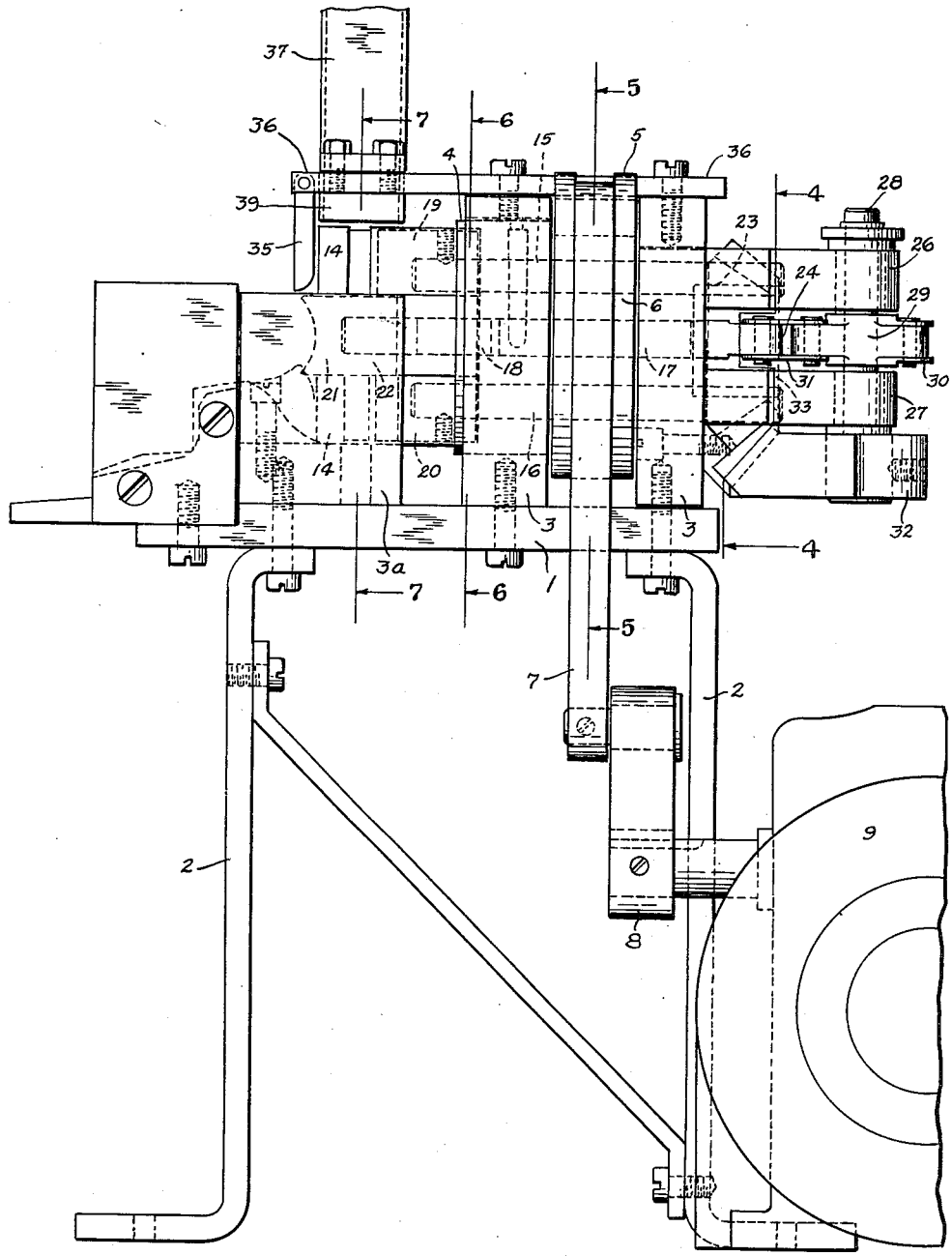

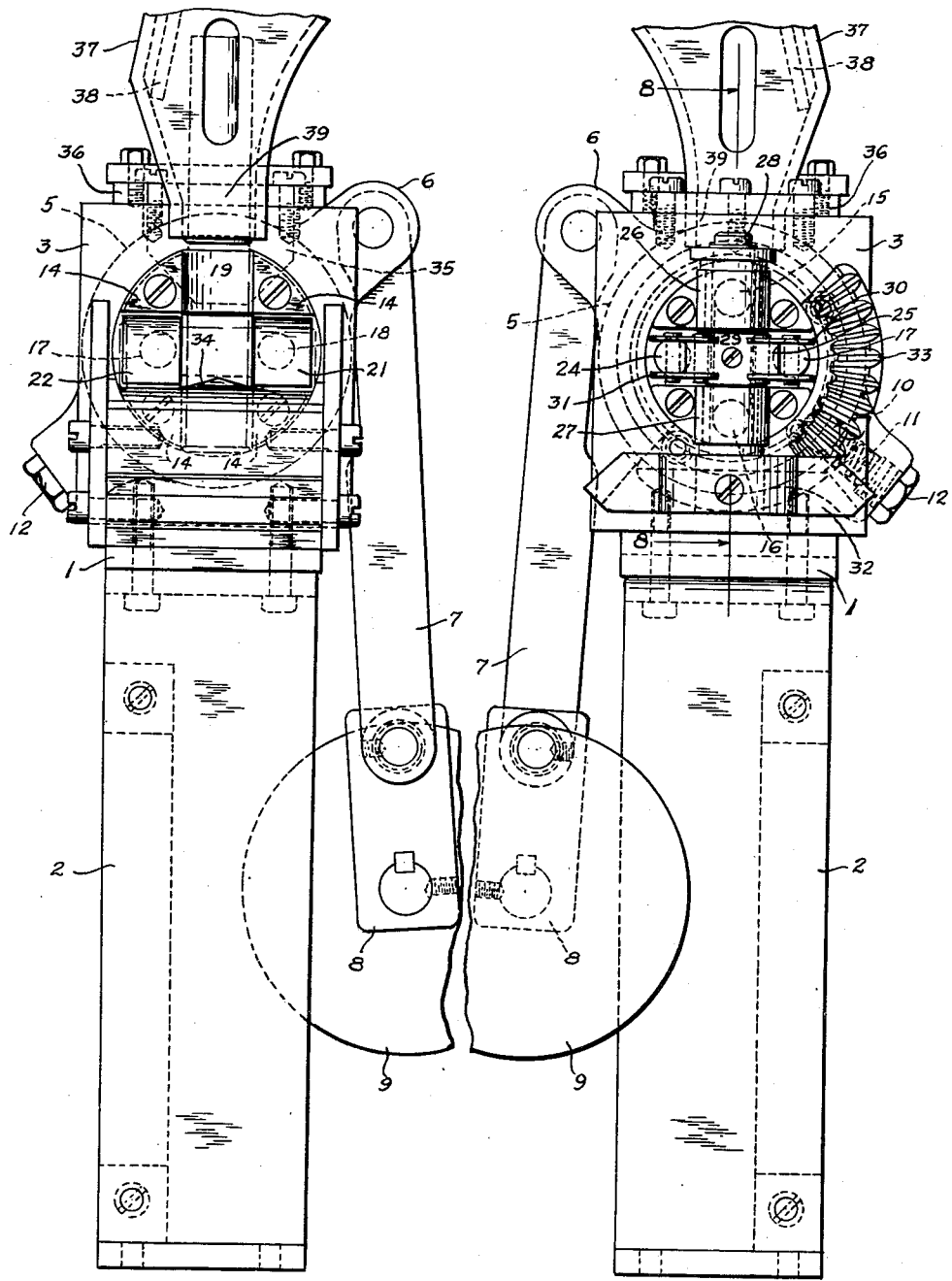

INVENTOR.
WILLIAM C. ASHBY
BY
ATTORNEYS

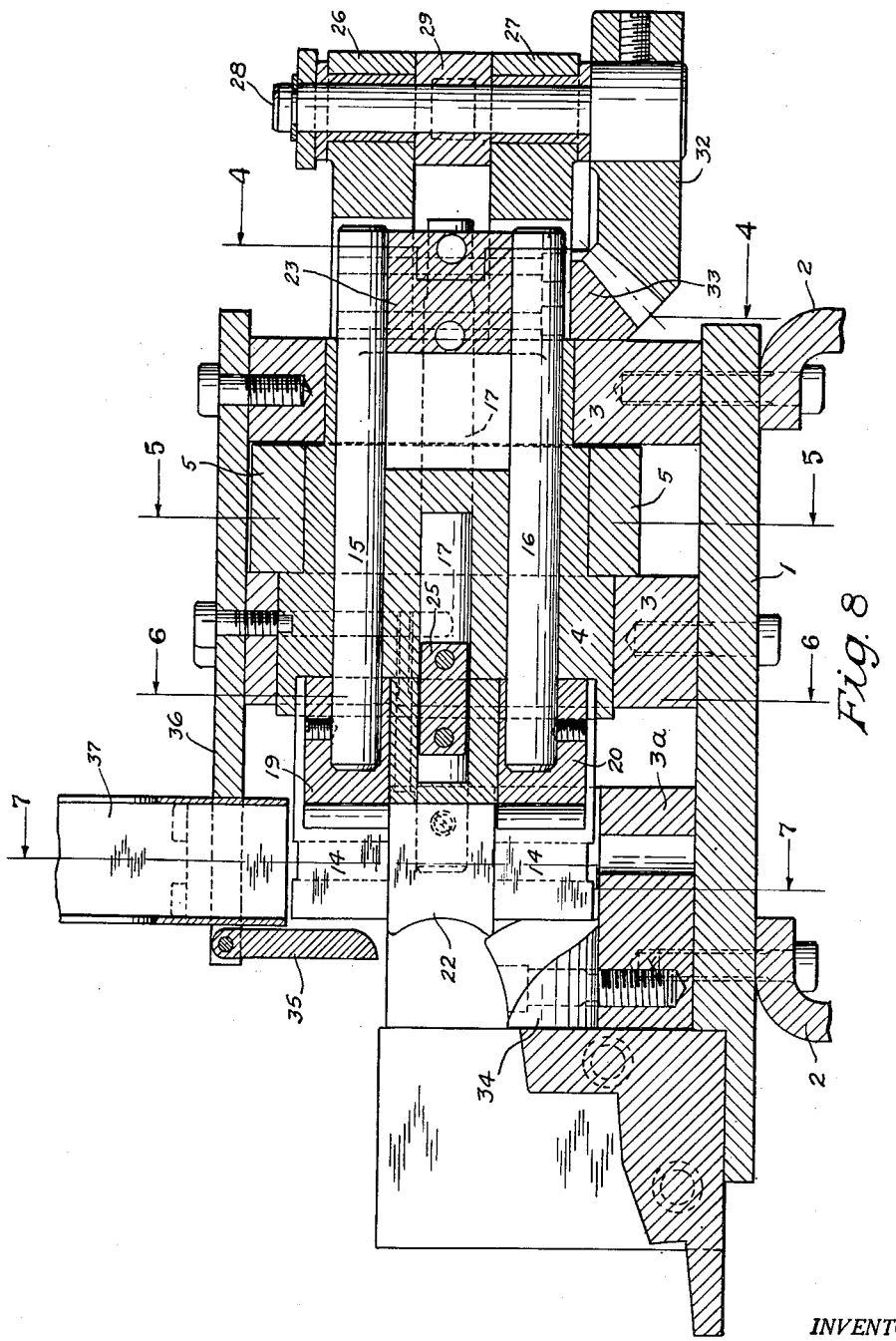

Aug. 27, 1957 W. C. ASHBY 2,804,237
FEED MECHANISM FOR ARTICLES
Filed Jan. 12, 1955 5 Sheets-Sheet 5
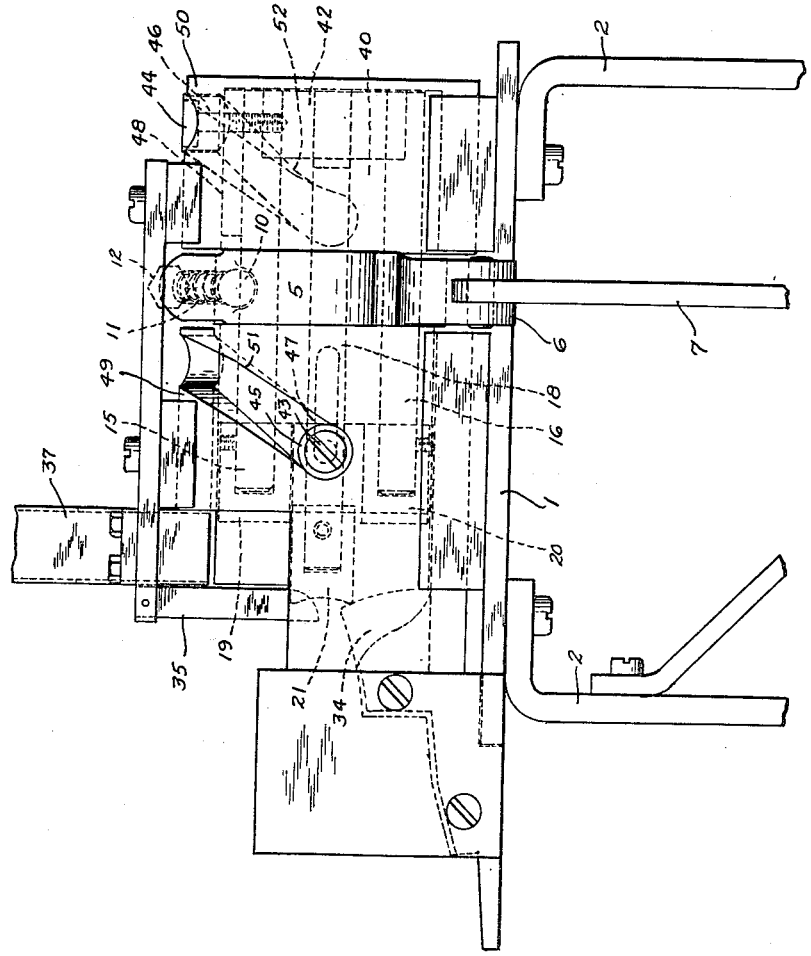
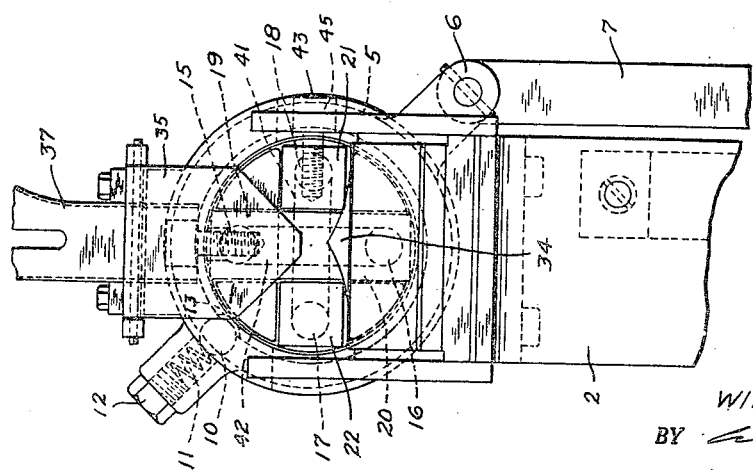
INVENTOR.
WILLIAM C. ASHBY
BY
ATTORNEYS

United States Patent Office 2,804,237
Patented Aug. 27, 1957

2,804,237

FEED MECHANISM FOR ARTICLES

William C. Ashby, Fairfield, Conn., assignor to Remington Arms Company, Inc., Bridgeport, Conn., a corporation of Delaware Application January 12, 1955, Serial No. 481,461

7 Claims. (Cl. 221—234)

This invention relates to feed mechanism which automatically re-orients the articles fed therethrough and delivers them in a predetermined arrangement. A preferred embodiment of this invention may be shown as a feed mechanism for a shot shell visual inspection and packing unit which receives shot shells through a feed tube in a non-alternating sequence either heads-first or heads-last and delivers them to inspection rails on which they lay side-by-side in alternating head-and-tail sequence.

The object of the invention is to provide a simple alternating feed mechanism which can be maintained with a minimum of attention, and one which, while positive in its alternating action, cannot exert force upon the article being fed sufficient to distort such an article or to explode a shell in the event of a jam in the feed or delivery mechanism.

I contemplate that these objectives can be best attained by the provision of a turnover drum in which the shells or other cylindrical articles may be diametrically placed one at a time, this drum being oscillated to turn the successively delivered articles in opposite directions and deliver them side-by-side in alternating sequence.

The exact nature of the invention as well as other objects and advantages thereof will become apparent from consideration of the following specification referring to the attached drawings in which:

Fig. 1 is a side elevational view of the feed unit.

Fig. 2 is a right end elevational view.

Fig. 3 is a left end elevational view.

Figure 4:
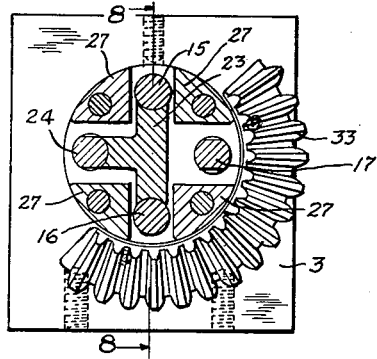
Figure 5:
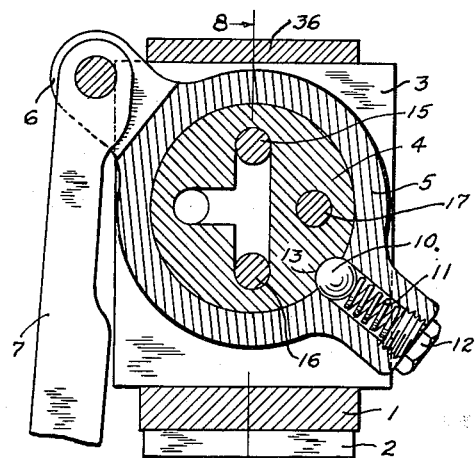
Figure 6:
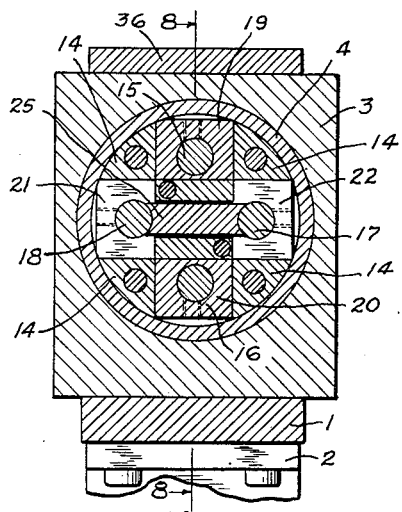
Figure 7:
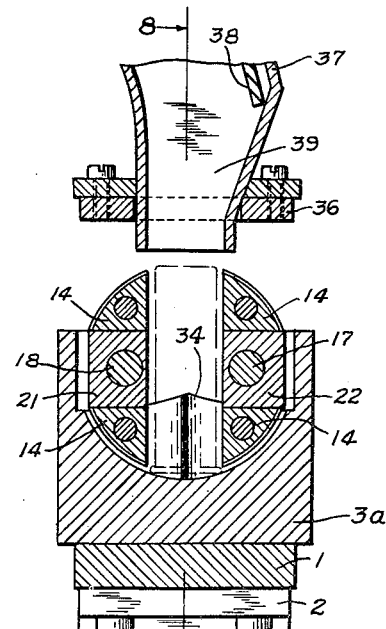

Figs. 4, 5, 6, and 7 are partial vertical cross-sectional views taken on the planes indicated in Figs. 1 and 8.

Fig. 8 is a partial vertical, longitudinal sectional view on the line 8—8 indicated on Figs. 2 through 7.

Fig. 9 is a side elevational view of a modified form of the feed unit.

Fig. 10 is an end elevational view of the modified form of the feed unit.

Referring to the drawings by characters of reference, it will be seen that I have provided a frame plate 1 supported on braced legs 2 and providing a mounting for a pair of journal blocks 3 and a half journal 3a. A turnover drum 4 is rotatably supported in the journal blocks and between these blocks is embraced by a yoke 5 formed with a crank 6 joined by a link 7 to the crank 8 of a slow speed gear reduction motor 9. The yoke 5 is also formed to define a radial bore in which there are received a ball detent 10, detent spring 11 and adjustable spring stop 12. The ball detent 10 bears in a shallow recess 13 on the outer circumference of the turnover drum 4, the spring stop 12 being so adjusted that in the event of any substantial resistance to turning of the drum 4 the detent will be cammed out of the recess 13, permitting the yoke to oscillate idly until the jam or other source of resistance is corrected.

Secured to the left hand end of the drum 4 are four blocks 14 which between themselves define a pair of slots intersecting at a right angle to each other on the axis of rotation of the drum. Alternatively, these slots could be formed by machining them directly in an elongated drum 4, although that would entail more complicated machining operations. The width and depth of the slots so formed should be only slightly more than the same dimensions of the article to be fed through the device and the diameter of the drum will preferably be equal to or slightly less than the length of the article to be fed, in the illustrated embodiment a loaded shot shell.

Four circumferentially spaced bores are formed in the drum in parallelism with the axis thereof, each bore receiving one of the plungers 15, 16, 17, and 18, to which are secured respectively the pushers 19, 20, 21, and 22 which operate in the slots defined between the blocks 14. The plungers 15 and 16 are joined at the right hand end of the drum (see Fig. 4) by a crosshead 23 of T-shaped cross-section which carries a short operating plunger 24. The plungers 17 and 18 are joined near the left hand end of the drum (see Fig. 6) by a crosshead 25, it being noted that the plunger 18 is short and that it operates in the same bore as the short operating plunger 24. The assembly of plungers 17 and 18 with crosshead 25 is operated by the right hand end of plunger 17. Appropriate cuts are provided in the drum to afford clearance for the crossheads 23 and 25, as shown in Fig. 8.

Attached to the right hand end of the drum are a pair of journal blocks 26 and 27 which support a diametrically extending shaft 28. Secured to the shaft 28 is a two-armed crank 29, the arms of this crank being respectively secured by links 30 and 31 to the short operating plunger 25 and to the full length plunger 17. Thus, as the shaft 28 is rotated, one of the two plunger assemblies will be advanced and the other retracted an equal amount within the limitations permitted by the throw of the crank 29.

The shaft 28 is caused to rotate as a function of oscillation of the drum 4 by means of a sector gear 32 secured to the shaft and meshing with a fixed sector gear 33 mounted on the right hand end one of the journal blocks 3. The gearing should be so timed that the pair of pushers in the vertically disposed slots (19 and 20 in the drawing) will be retracted to their extreme position while the pair of pushers in the horizontally disposed slots (21 and 22 in the drawing) will be advanced to the limit, these pushers moving to the opposite extreme as the drum is oscillated to bring the formerly vertically disposed pushers to a horizontal position.

With this arrangement, each revolution of the crank 8 on the drive motor 9 results in one cycle of oscillation of the drum 4 between its two extreme positions spaced apart by 90°. As the drum oscillates, the ejection pushers reciprocate between two extreme positions, being fully retracted in a vertically disposed arrangement and fully advanced in a horizontally disposed arrangement. This permits a shell to be fed into the vertically disposed slot and causes the ejection of the shell as the slot and shell reach a horizontal position.

Opposed to the lower left hand end of the turnover drum is a block 34 formed on its vertical center line to fit substantially flush with the left hand end face of the turnover drum. This central portion of the block has the function of closing the lower portion of the vertically disposed slot in the drum to insure that an article fed into that slot will remain in position to be oriented rather than to fall out endwise from the vertical slot. The upper portion of the vertically disposed slot is closed by a swinging gate 35 depending from a support bar 36 mounted on the journal blocks 3.

In Figs. 9 and 10, I have shown a simplified arrangement for oscillating the plungers in a similar turnover drum 40. This drum, like that previously described, is formed to define at its left hand end a cruciform slot receiving pushers identical with the pushers 19, 20, 21 and 22 previously described and they function in the same way. Like the previous drum, four bores are provided parallel with the drum axis and spaced at 90° apart. These bores receive plungers 15, 16, 17, and 18 directly connected to the pushers. The two plungers 17 and 18 are connected together near the left hand end of the drum by a crosshead 41, an appropriate clearance cut being provided in the drum between the plungers 17 and 18 to permit reciprocation of the crosshead with the plungers.

Similarly, at the right hand end of the drum, a crosshead 42 is provided to connect the plungers 15 and 16 and a clearance cut is provided between the plungers 15 and 16 to permit the reciprocation of this crosshead.

The plunger-pusher assemblies are reciprocated by means of a cam pin 43 engaging the plunger 18 and crosshead 41 and a cam pin 44 engaging the plunger 15 and crosshead 42. Each of the cam pins is provided with a roller cam follower, respectively 45 on pin 43 and 46 on pin 44. Longitudinal slots 47 and 48 are provided in the drum to permit the reciprocation of the cam pins.

In this modification the drum is journaled in a pair of sleeves 49 and 50 supported from the frame 1 as the bearing blocks 3 are supported in the earlier described modification and the drum is oscillated in the same way by a yoke 5 operated by a crank 6 and link 7. The sleeves 49 and 50 are each machined to define a spiral cam track, respectively 51 and 52, receiving one of the cam followers 45 and 46. Thus, as the drum is oscillated in its 90° cycle, the plungers are advanced and retracted so that the pair of horizontally disposed pushers are advanced to eject a turned-over shell from the end of the drum while the pair of vertically disposed pushers are retracted to receive a new shell from the feed tube 37. In all respects except the provision for reciprocating the pusher assemblies, the two modifications function identically.

As the drum is oscillated in either modification, the pushers in the vertically disposed slot move progressively out of the slot. This movement of the article as the drum oscillates requires that the block 34 be cut back at both sides of its vertical center line, defining a curve which maintains a substantially constant distance from the face of the advancing ejector plunger as the drum oscillates. At the top portion of the drum a similar function is provided by the swinging gate 35 which swings outwardly as the turning shell is pushed outwardly by the pushers.

As the shell reaches a horizontal position, it is pushed free of the slot and the restraint imposed by the gate 35 and the block 34 and the shell rolls over the inclined top surface of the block 34 to pass to the inspection rails.

As one slot reaches the horizontal position and ejects the shell or other article carried therein, it will be obvious that the other slot will reach a vertical position. It will be remembered that in the vertical position the pushers will be retracted to the maximum degree and that the vertically disposed slot is therefore free to receive another article for re-orientation.

The feed of articles to the turnover drum is preferably a gravity feed and may be as simple as a feed pipe terminating adjacent the circumference of the drum in prolongation of an article received in the vertically disposed slot. In many cases, however, and particularly in the case of shot shells, a column of substantial length may be involved and following prior practice it is preferable to bring the feed in at an angle and deliver to the turnover drum through a feed fixture 37 in which a substantial component of the static weight of a column of articles is received by a deflector wall 38. The terminal portion 39 of this feed fixture is arranged to properly align an article with the vertical slot, the article dropping freely into the slot from a position of engagement with the circumference of the drum as soon as the slot reaches the vertical position. Succeeding articles will be stopped by engagement of the leading one with the trailing end of the article just deposited in the slot, and as the turnover drum carries the article in the slot away from the feed fixture, the succeeding article will rest on the circumference of the drum.

Since the drum oscillates in a 90° cycle, the articles fed into the drum will be alternately turned in opposite directions and ejected in axially parallel relationship. In the preferred embodiment, the articles being fed are shotgun shells which are delivered through the feed fixture in heads-first column. The turnover drum re-orients these shells, laying them down in axially parallel relationship and alternates them so that on the delivery track the shells are in alternating head-and-tail sequence for the best utilization of packing space.

Although the invention has been illustrated and described with specific reference to the handling of shot shells, it will be realized that the utility of the invention is by no means limited to that article. For an exact definition of the limits of the invention, reference may be had to the appended claims.

I claim:

1. An automatic feed mechanism for feeding one at a time side-by-side in alternating head-and-tail sequence substantially cylindrical articles delivered in column to said feed mechanism in non-alternating sequence, said feed mechanism comprising a turnover drum, means to oscillate said drum about a horizontal axis in a 90° cycle; means defining a pair of slots disposed at right angles to each other in an end of said drum, said slots having a cruciform intersection on the axis of oscillation of said drum, each of said slots being of such dimensions as to be capable of receiving one of said articles, said slots being so oriented that one of them is vertical at each extreme of drum oscillation; means to deliver one of said articles into each slot in said drum as each slot reaches a substantially vertical position, and pusher means acting along a line parallel to the horizontal axis of the drum to eject said articles from the end of the drum as each slot reaches a substantially horizontal position, said pusher means comprising a pair of plungers for each slot, said plungers being arranged for reciprocation along axes parallel to the axis of said turnover drum and so positioned as not to obstruct the intersection of said slots, and operating means for said plungers arranged to advance the plungers in the slot approaching the horizontal position to substantially the end of the drum for ejecting an article from the slot and to retract the plungers in the slot approaching the vertical position to a position clear of the entrance from the delivery means to permit an article to be fed to the slot.

2. Feed mechanism as described in claim 1, said delivery means comprising a feed fixture in which said articles are arranged in column, said feed fixture terminating adjacent the outer circumference of said turnover drum, with the column of articles in substantially axial alignment with the vertically disposed position of said slots, whereby the lowermost article in said column of articles may be fed into said turnover drum as a slot reaches the vertical position.

3. Feed mechanism as described in claim 2, said turnover drum having a diameter substantially equal to the length of one of said articles, whereby an article fed into said slot will serve to prevent a following article from entering said slot and the outer circumference of said drum will support said following article while the drum is oscillating to present the other slot in substantially vertical position.

4. Feed mechanism as described in claim 3, at least the lower half of said turnover drum being circumferentially enclosed to retain said articles in said slots until the slots reach a substantially horizontal position for ejection of said articles.

5. Feed mechanism as described in claim 4, the operating means for said plungers being constructed and arranged to advance and retract said plungers in movement substantially proportional to the oscillation of the drum between the two extremes of drum oscillation, and blocking means opposed to the end face of the drum which is intersected by said slots below the level of the bottom of a horizontally disposed slot, said blocking means substantially closing the lower portion of a vertically disposed slot and being formed to depart from the end face of the drum to each side of the vertical in an amount substantially equal to the advancement of the plungers at that degree of drum oscillation.

6. Feed mechanism as described in claim 5, said plunger operating means comprising a shaft extending diametrically across said drum and journaled thereon, cranks on said shaft coupled to said plunger means, a gear on said shaft and a fixed gear engaged with the gear on said shaft to cause said shaft to oscillate relative to said drum as the drum is oscillated.

7. Feed mechanism as described in claim 5, said plunger operating means comprising a pair of crossheads, each crosshead joining one of the pairs of plungers for one slot into a unitary assembly, a cam follower mounted on each crosshead, and fixed means defining a spiral cam in which each of said cam followers is received, said cam means being formed to advance a unitary pair of plungers to ejecting position as that pair of plungers approaches a horizontal position and to retract a unitary pair of plungers to position for receiving an article as that pair of plungers approaches a vertical position.

References Cited in the file of this patent
UNITED STATES PATENTS

| | | |
|---|---|---|
| 1,347,851 | Haefele | July 27, 1920 |
| 2,108,280 | Wright | Feb. 15, 1938 |
| 2,662,646 | McCain | Dec. 15, 1953 |